(12) United States Patent
Srinivasan et al.

(10) Patent No.: US 11,907,642 B2
(45) Date of Patent: Feb. 20, 2024

(54) ENHANCED LINKS IN CURATION AND COLLABORATION APPLICATIONS (71) Applicant: Microsoft Technology Licensing, LLC, Redmond, WA (US)

(72) Inventors: Varun Srinivasan, Seattle, WA (US); Gregory Akselrod, Seattle, WA (US); David John Rasmussen, Redmond, WA (US); Eun Ju Nam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/582,803

(22) Filed: Jan. 24, 2022

(65) Prior Publication Data
US 2022/0147696 A1 May 12, 2022

Related U.S. Application Data (63) Continuation of application No. 13/894,448, filed on May 15, 2013, now Pat. No. 11,232,250.

(51) Int. Cl.
*G06F 17/00* (2019.01)
*G06F 40/134* (2020.01)
*G06F 40/103* (2020.01)
*G06F 40/279* (2020.01)

(52) U.S. Cl.
CPC .......... *G06F 40/134* (2020.01); *G06F 40/103* (2020.01); *G06F 40/279* (2020.01)

(58) Field of Classification Search
CPC ..... G06F 40/134; G06F 40/103; G06F 40/279
See application file for complete search history.

(56) References Cited

U.S. PATENT DOCUMENTS

| 10,268,667 | B1 * | 4/2019 | Pachikov | G06F 16/93 |
| 2002/0073058 | A1 * | 6/2002 | Kremer | H04L 67/02 |
| 2005/0071748 | A1 * | 3/2005 | Shipp | G06F 16/9566 |
| | | | | 707/E17.115 |

(Continued)

OTHER PUBLICATIONS

"Share Links and Set Preview Preferences", Retrieved From: https://web.archive.org/web/20200416140123/https://slack.com/intl/en-in/help/articles/204399343-Share-links-and-set-preview-preferences, Apr. 16, 2020, 4 Pages.

(Continued)

*Primary Examiner* — Mohammed H Zuberi
(74) *Attorney, Agent, or Firm* — NovoTechIP International PLLC (57) ABSTRACT A method of enhancing a link in collaboration applications includes determining, from content entered into a collaboration application, a string of characters indicating a uniform resource locator (URL). Upon determining the string of characters indicating the URL from the content entered into the collaboration application, the method includes automatically calling a first web service to obtain a representation of content referenced by the URL by sending a request, at least including the URL, to the first web service. The representation of the content referenced by the URL can then be (Continued)

received from the first web service in a format customized for the collaboration application, a computing device on which the collaboration application is implemented, or both.

19 Claims, 9 Drawing Sheets

(56) References Cited

U.S. PATENT DOCUMENTS

| | | | | |
|---|---|---|---|---|
| 2006/0277460 | A1* | 12/2006 | Forstall | G06F 16/9577 707/E17.121 |
| 2007/0106952 | A1* | 5/2007 | Matas | G06F 16/9577 715/764 |
| 2007/0150513 | A1* | 6/2007 | Vanden Heuvel | G06F 40/284 |
| 2008/0307301 | A1* | 12/2008 | Decker | G06F 16/9577 715/241 |
| 2010/0057864 | A1* | 3/2010 | Laird-Mcconnell | G06Q 10/107 709/206 |
| 2010/0210244 | A1* | 8/2010 | Andreasson | H04L 51/18 455/412.1 |
| 2012/0111936 | A1* | 5/2012 | Brown | G06K 7/1417 235/375 |
| 2013/0318063 | A1* | 11/2013 | Ayzenshtat | G06F 16/951 707/707 |
| 2014/0089239 | A1* | 3/2014 | Hu | G06F 16/435 706/12 |
| 2014/0372865 | A1* | 12/2014 | Corob | G06F 40/166 715/234 |

OTHER PUBLICATIONS

"Slack is your Digital HQ", Retrieved From: https://slack.com/intl/en-in/, Retrieved Date: Dec. 7, 2021, 6 Pages.

"Unfurling Links in Messages", Retrieved From: https://web.archive.org/web/20200503200654/https://api.slack.com/reference/messaging/link-unfurling, May 3, 2020, 19 Pages.

Haughey, Matt, "Everything You Ever Wanted to Know About Unfurling But Were Afraid to Ask /or/ How to Make Your Site Previews Look Amazing in Slack", Retrieved From: https://medium.com/slack-developer-blog/everything-you-ever-wanted-to-know-about-unfurling-but-were-afraid-to-ask-or-how-to-make-your-e64b4bb9254, Nov. 25, 2015, 15 Pages.

\* cited by examiner

ENHANCED LINKS IN CURATION AND COLLABORATION APPLICATIONS

CROSS-REFERENCE TO RELATED APPLICATION

This application is a continuation of U.S. application Ser. No. 13/894,448, which was filed May 15, 2013.

BACKGROUND

Being able to share and collect information from various sources is made ever easier by the various widgets, applications, and devices at a user's fingertips. One common resource for content is the World Wide Web (or the "Web"). Methods and applications for capturing, curating and sharing content obtained from the Web continue to be developed.

Digital notebooks, such as MICROSOFT ONENOTE from Microsoft Corp. and EVERNOTE from Evernote Corp., are becoming popular for content curation and task management. Features of these and other digital notebooks include capabilities of capturing, storing, and sharing all kinds of information including photographs, emails, business cards, wish lists, receipts, to-do lists, travel plans, and recipes—some of which may be available from websites. Often, a uniform resource locator (URL) of a webpage is included in a note to facilitate the user's return to the source of some content entered into the note.

BRIEF SUMMARY

Enhancements of a URL link inserted into a curation or collaboration application are described. An enhancement/capture service is described that takes in a URL and returns an image rendering of the webpage. In one embodiment, insertion of a URL into a curation and/or collaboration application such as a notebook application automatically initiates the call to the capture service. In another embodiment, a checkbox, button, menu item, or other input field can be used to receive a user's input to initiate the call to the capture service.

In some cases, the URL sent to the enhancement/capture service can be determined from a web browser in which a user is viewing content of a webpage and selects to share. A preview pane is described that approximates taking a screenshot of the webpage the user is sharing to a note (or other file). Because, in many cases, the web browser only shares the URL, page title, and perhaps some additional metadata (e.g., some defined meta tag content), the notebook application (or other curation and/or collaboration application) to which the user is intending to share the URL separately retrieves the page to insert into the user's note. According to various implementations, the separate retrieval of the webpage is performed server-side.

A method of enhancing a link in collaboration applications includes determining, from content entered into a collaboration application, a string of characters indicating a uniform resource locator (URL). Upon determining the string of characters indicating the URL from the content entered into the collaboration application, the method includes automatically calling a first web service to obtain a representation of content referenced by the URL by sending a request, at least including the URL, to the first web service; and receiving the representation of the content referenced by the URL from the first web service in a format customized for the collaboration application, a computing device on which the collaboration application is implemented, or both.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Enhancements of a URL link inserted into a curation or collaboration application are described. The "enhancement" of a link can involve, at a minimum, including a representation of content from the source at the URL link when a URL is determined to be received. Implementations can enhance URLs accessible over the Internet. Available schemes for the URLs may include hypertext transfer protocol (HTTP), file transfer protocol (FTP), the Gopher protocol (gopher), Electronic mail address (mailto), Usenet news (news), and Wide Area Information Servers (WAIS).

The enhancement can be accomplished by a service accessed by a client, such as a digital notebook, in order to provide a high resolution capture of the content as well as additional processing, which can minimize the effects of limitations imposed by the particular client being used.

As people use multiple devices and technologies to perform various tasks and want to access their content and applications across varied clients, an experience that works across the varied clients continue to be developed.

For example, notes and other information can be saved and searched using a web-application based digital notebook accessed via a browser or a digital notebook application running on a mobile device, tablet, or desktop that has at least occasional access to a network. In addition to providing a repository for organizing and searching information, digital notebooks can provide file saving and sharing in the cloud where notes can be synced across computers and devices. For example, in a digital notebook, it is possible to save files to cloud storage or other location. Then, once content is saved to a digital notebook, the content can be viewed, edited, synced (across multiple devices), and shared. Some notebook applications enable a user to share notes in a manner that lets the user work together with family members, colleagues, or classmates on the same notes at the same time.

There are many instances where a user provides a link or takes note of a URL for a webpage in order to share the information on that site with others or record the link for themselves for later access or return. When on a website, information may be copied or "clipped" into a note. Clipping refers to the capturing (or extracting) of text, images or other content from a website for reading later when not on the web site, and even off-line. Because each web browser has some different capabilities, clippers (the tool used to clip information from a website) may be configured based on the web browser. Some webpage "clippers" capture information of a region of a screen within a selected box or frame. Then this information can be stored in a note along with a URL of the website.

When including a URL of a webpage into a note (or even as part of a message or post), many applications include enhancements such as a representation of the webpage based on the title of the page, a main image on the page (also referred to as a hero image) and a description. This representation may be referred to as a snippet. Snippets are based extracted from the hypertext markup language (HTML) provided by the page, and refer to a short text and/or image preview that can be displayed, for example, when representing the webpage in a search result list. HTML involves a set of markup tags (and plain text) that describe document content, including webpages. Some of this content may be available from meta tags defined using the Open Graph protocol.

In some cases, obtaining the snippet from the HTML provided by the application is sufficient (and for certain applications there is no representation available on the web). However, there are many scenarios in which a user would like to capture a high fidelity representation of a webpage. A snippet is not a complete representation of the webpage or screenshot. While the snippet is useful for bookmarking a page in a notebook, a snippet does not contain the webpage in its entirety. Therefore, if a user would like to annotate a webpage (in its entirety) or save a screenshot of the webpage for offline consumption a snippet is not sufficient.

Some applications using HTML, such as web browsers, can share (e.g., provide to the note or other application) both a snippet and the URL to the source. For applications sharing the URL to the source, various embodiments of the invention follow the URL and offer to capture a representation of the full page content.

Implementations are available that capture more than just what is visible on a viewing screen of a user device, clipped, or provided as a snippet. By using a service for URL enhancement, larger or higher resolution screenshots can be rendered and inserted into a note.

Certain embodiments facilitate the capture of content on a webpage for curation and collaboration. In further embodiments, the annotation capabilities of a note taking application can be leveraged by incorporating the URL content capturing techniques described herein. Content curation is the organization and presentation (or sharing) of content from various sources.

In one embodiment, a capture service is disclosed that can render the URL as an image, which can be stored in a note. The rendering of the URL as an image by the service can store the webpage in high fidelity, and enable a user to annotate on it.

In another embodiment, the webpage is captured from the document object model (DOM) in its current state, and rendered using a browser control, which can provide browsing, document viewing, and data downloading. The rendering of the webpage using the browser control can preserve the fidelity of the page and enable a user to select text, use interactive controls like hyperlinks and potentially even annotate on or edit the content.

Figure 1A:
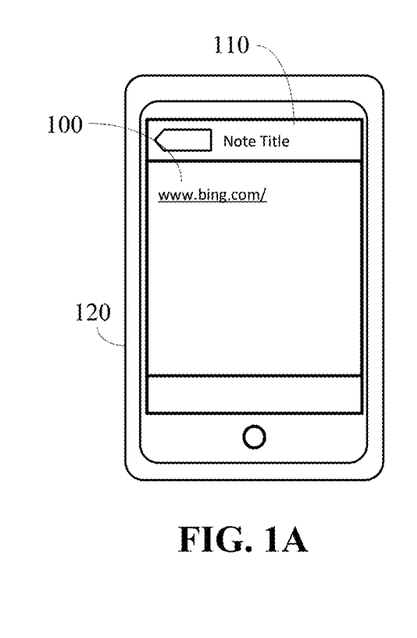
FIGS. 1A-1C illustrate a scenario involving an implementation of a URL enhancer for a notebook application.
Figure 1B:
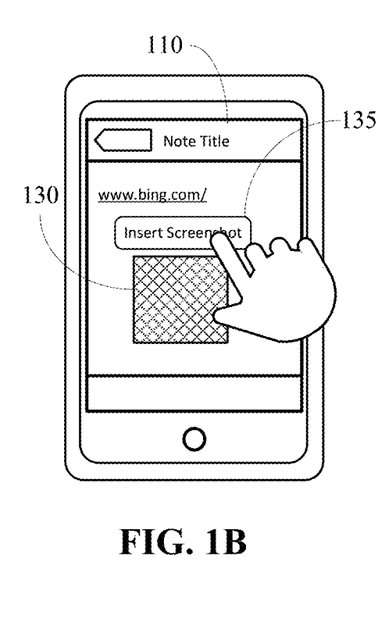
Figure 1C:
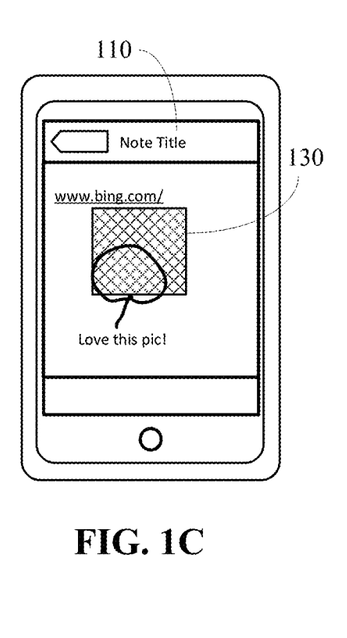

FIGS. 1A-1C illustrate a scenario involving an implementation of a URL enhancer for a notebook application. Referring to FIG. 1A, a URL 100 may be input to a note 110 displayed on a mobile computing device 120. The client in which the note is created and modified can determine that a URL 100 is input. Currently, a URL string may resolve to include a hyperlink enabling the user to click the link and open the webpage identified by the URL. According to an embodiment, a screenshot 130 of the content referenced by the URL can automatically be displayed in the note when the URL is determined. The user may have an option to keep or remove the screenshot 130 in the document. In another embodiment, such as shown in FIG. 1B, upon determination that a URL is input to the note 110, an option, such as a button 135, checkbox, or other input field, can be provided to the user to enable the user to select to insert the screenshot 130. Once the screenshot 130 is included in the note 110, the user can annotate on the screenshot, such as shown in FIG. 1C.

In certain implementations, a method of facilitating content capture and curation is provided that includes determining a URL for content, calling a capture service, and receiving a representation of the content referenced by the URL from the capture service in a format customized for the client. In some cases, the determining of the URL for the content can occur from within a notebook (or other curation or collaboration) application by recognizing that a URL has been inserted (for example by text recognition of a string of characters). In some cases, the determining of the URL for the content can occur by receiving the URL from a web browser of a client in which the content is rendered.

"Calling" a web service (also commonly phrased as "invoking" a web service) refers to an action (or actions) that a client application performs to use the web service. It should be understood that a first web service may also "call" a second web service, where the actions may be similar to those performed by a client application in calling a web service.

The representation of the content received by the client can be in a format customized for the client, for example, as a high fidelity image with or without content captured from the DOM. In some cases, metadata associated with the content can be provided with the representation of the content.

According to certain implementations, a user can select to share content being viewed within an application that is capable of sharing a URL identifying the content resource. An example of an application capable of sharing the URL is a web browser. For brevity, a web browser will be discussed as the application in which a user is viewing content and from which the URL identifying the content source (or resource of the content) is shared. However, it should be understood that certain of the implementations described herein are applicable to other applications capable of sharing a URL identifying the resource of the content viewed at a client.

There are a number of applications that a user may select to share content. Some involve social media applications, such as FACEBOOK and TWITTER; others involve communication applications such as email and text messaging applications; and yet others involve collaboration and notebook applications, including a clipboard application such as PINTEREST and notebook applications such as ONENOTE and EVERNOTE.

When browsing the Web, a user may come across a webpage that the user would like to collect for sharing or curation. An application used to share content may be accessed, for example by an operating system managed menu (such as MICROSOFT WINDOWS Charm Bar) or other menu or pinned item that opens the sharing application for receiving the URL from the web browser. In some cases, the application used to share content is able to receive content without requiring the user to navigate away from the webpage as well as having scenarios for receiving content that a user may complete while in the context of another application.

Figure 2A:
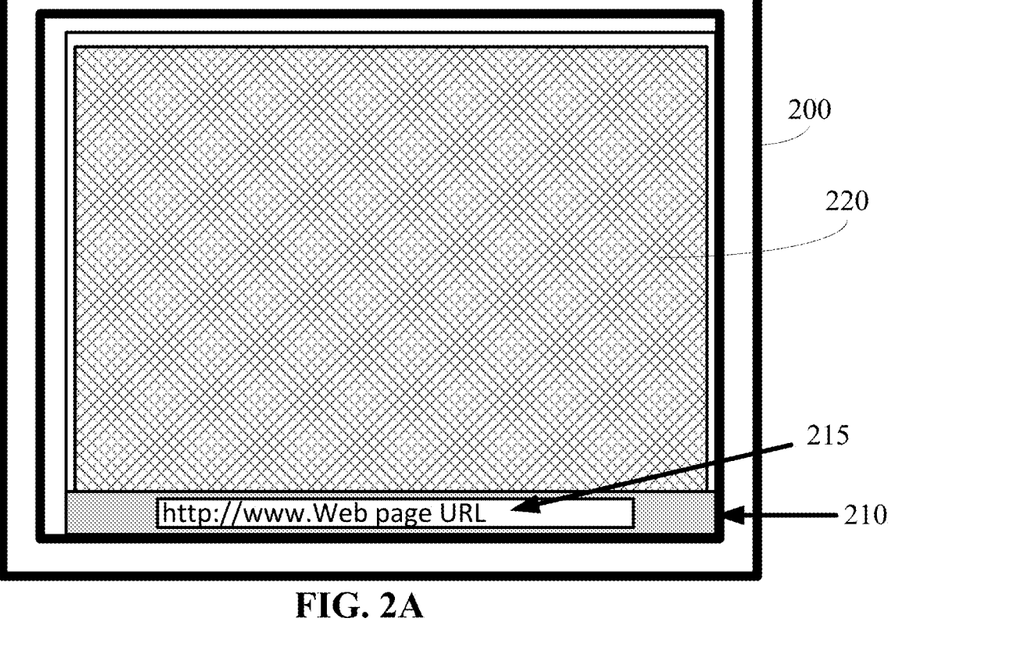
FIGS. 2A-2D illustrate a scenario involving an URL enhancer for a notebook application that may be implemented on a tablet device having a web browser client.
Figure 2B:
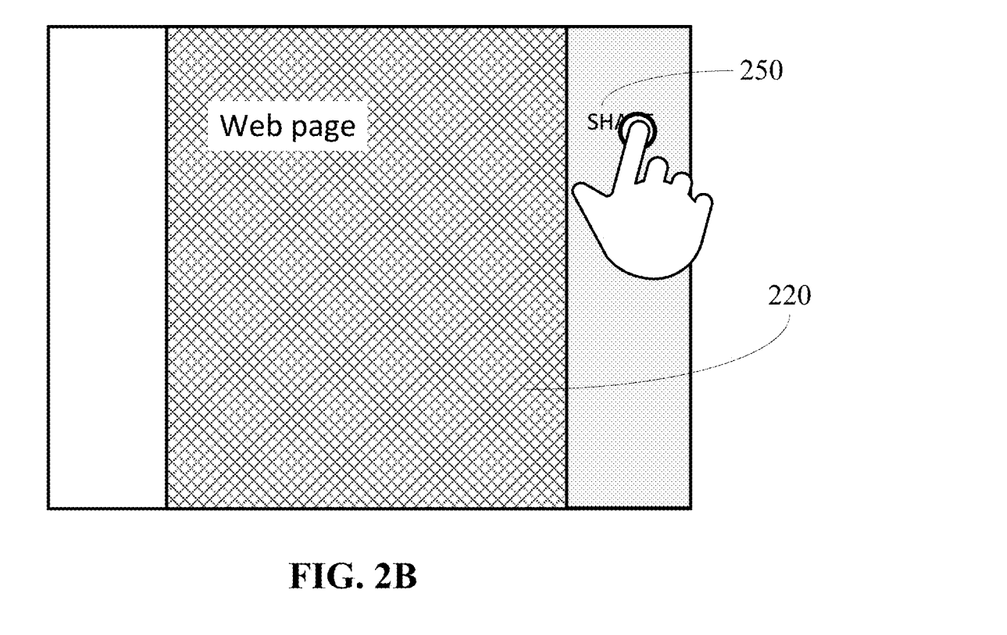
Figure 2C:
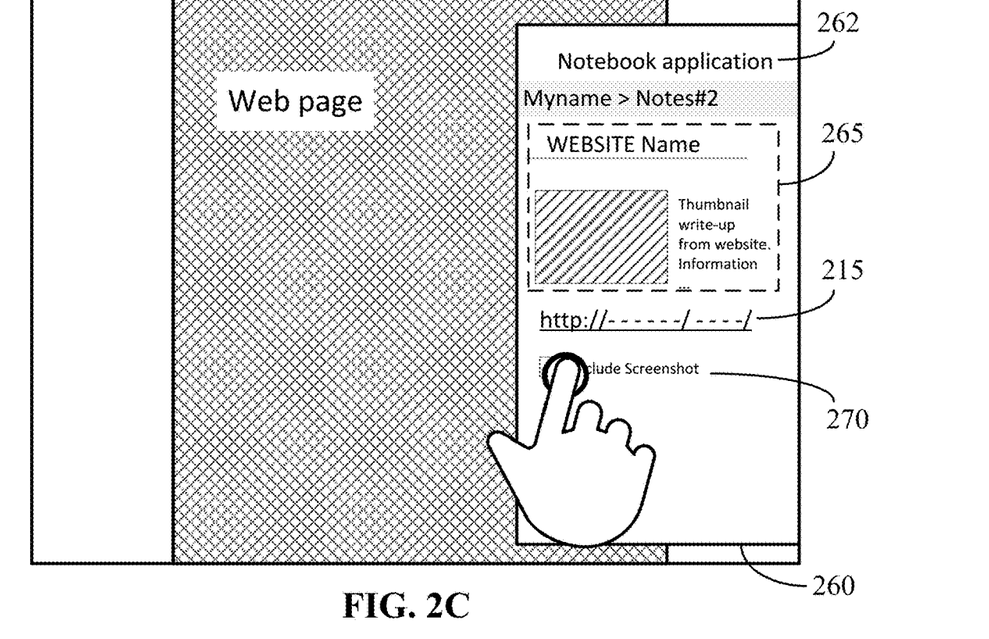
Figure 2D:
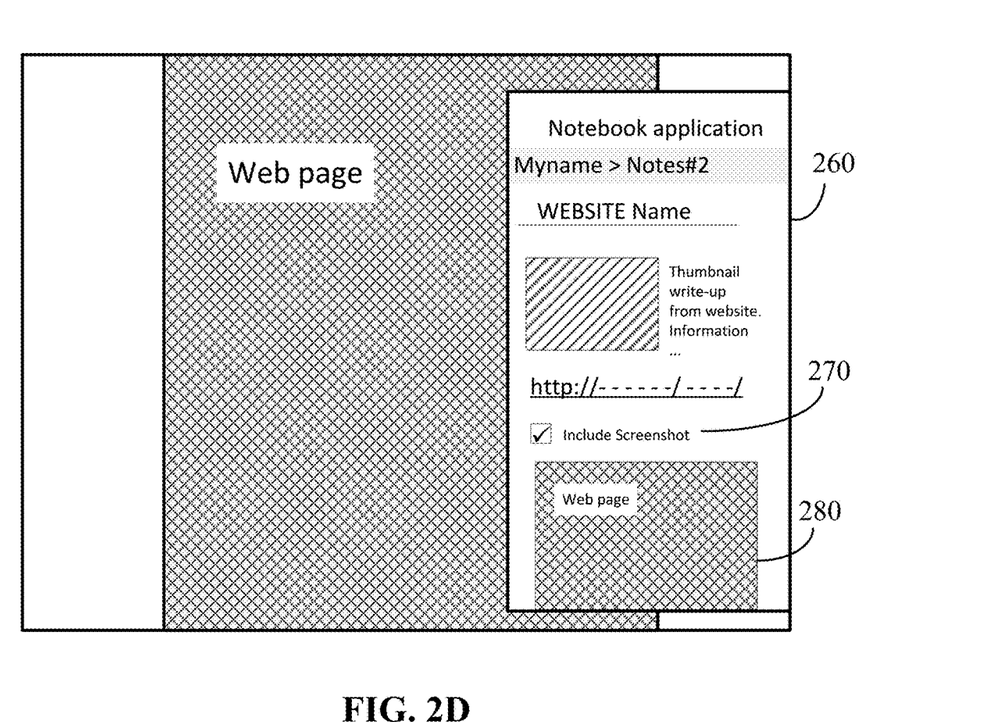
Figure 3A:
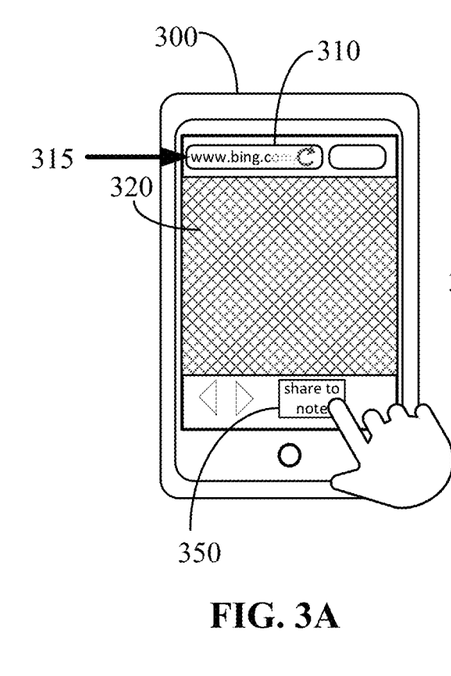
FIGS. 3A-3C illustrate another scenario involving an URL enhancer for a notebook application that may be implemented on a mobile device having a web browser client.
Figure 3B:
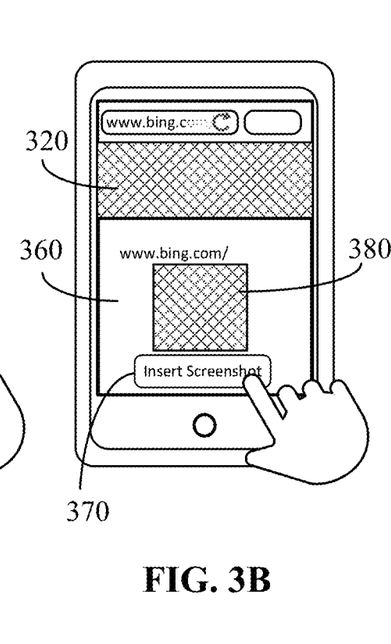
Figure 3C:
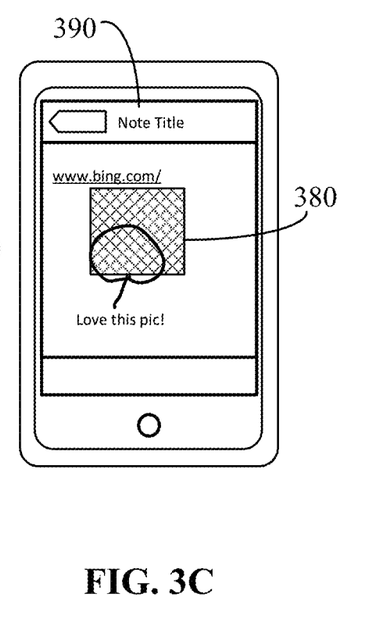

FIGS. 2A-2D illustrate a scenario involving an URL enhancer for a notebook application that may be implemented on a tablet device 200 having a web browser client 210; and FIGS. 3A-3C illustrate another scenario involving an URL enhancer for a notebook application that may be implemented on a mobile device 300 having a web browser client 310.

Referring to FIG. 2A, a user may enter a URL 215 in the web browser client 210 to render the webpage 220 in the display of the tablet device 200.

Accessing and launching the application used to share content may be carried out by a touch, mouse click, voice request or other input or gesture. In another case, this application may be launched programmatically. FIGS. 2B and 3A illustrate example user interfaces for launching the application used to share content through a touch input. For example, as shown in FIG. 2B, a user may select to share (250) the webpage 220. Similarly, as shown in FIG. 3A, a user of a mobile device 300 may enter a URL 315 in a web browser client 310 and then select to share the webpage 320 to a note (350).

As shown in FIGS. 2C, 2D, and 3B, a preview pane (or pop-up) 260, 360 can open so that a user can view a preview of the content being inserted into the application used to share content. The application used to share content can be a notebook application (such as notebook application 262). In addition, the preview pane may include features for a user to control where the content is assigned (e.g., the name of the note, the account associated with the note).

In some implementations, accessing the application used to share content may launch a preview pane or other window (260, 360), displaying the URL 215, 315 shared from the web browser. Currently, a thumbnail 265 may populate the preview pane when the URL is shared with the application used to share the content (such as notebook application 262). The thumbnail may be included whenever the HTML of a webpage includes such an element.

According to embodiments, the application used to share content can recognize that the URL is being inserted. In some cases, a screenshot enhancement to the URL can be automatically initiated. In some cases, an option to include a screenshot may be provided to the user (before and/or after retrieving the screenshot).

Referring to FIG. 2C, a user may select (270) to include a screenshot, and then as shown in FIG. 2D, a screenshot 280 of the webpage can be shown in the preview pane 260. An option, such as a button, checkbox, or other input field, can be provided to the user to enable the user to select to include the screenshot.

Similarly, as shown in FIG. 3B, a user may select (370) to include a screenshot (380), which is shown in the preview pane 360. An option, such as a button, checkbox, or other input field, can be provided to the user to enable the user to select to include the screenshot.

When the application used to share content is the notebook application, the screenshot (and any other information) can be viewed in the note when the notebook application is opened. Once the screenshot 380 is included in the note 390, the user can annotate on the screenshot, such as shown in FIG. 3C.

Figure 4:
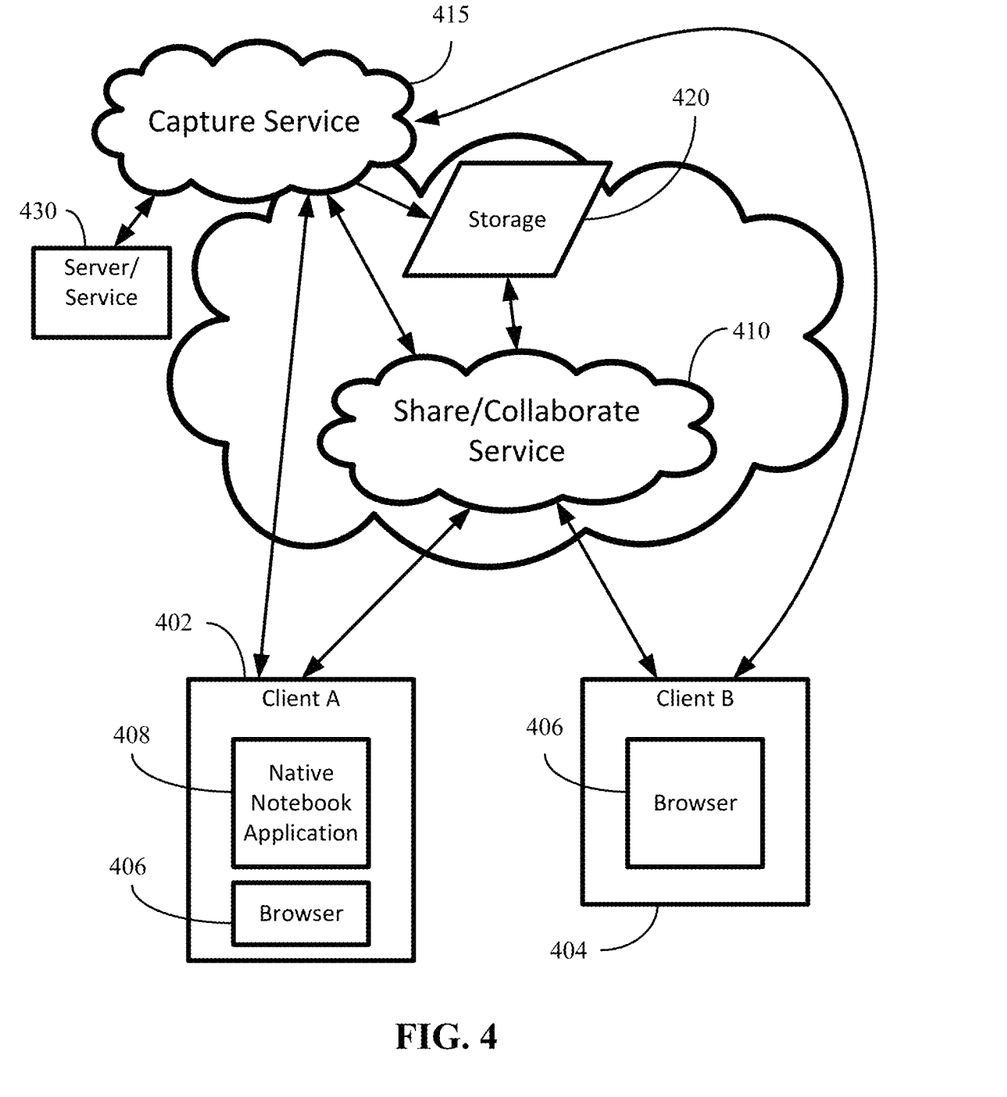
FIG. 4 illustrates an operating environment in which the URL enhancement may be practiced.

FIG. 4 illustrates an operating environment in which the URL enhancement may be practiced. As illustrated in FIG. 4, an operating environment for a user may include one or more clients 402, 404. The clients may be embodied as a computing device such as a desktop, laptop, smartphone, tablet, reader, game console, smart television and the like.

Figure 5:
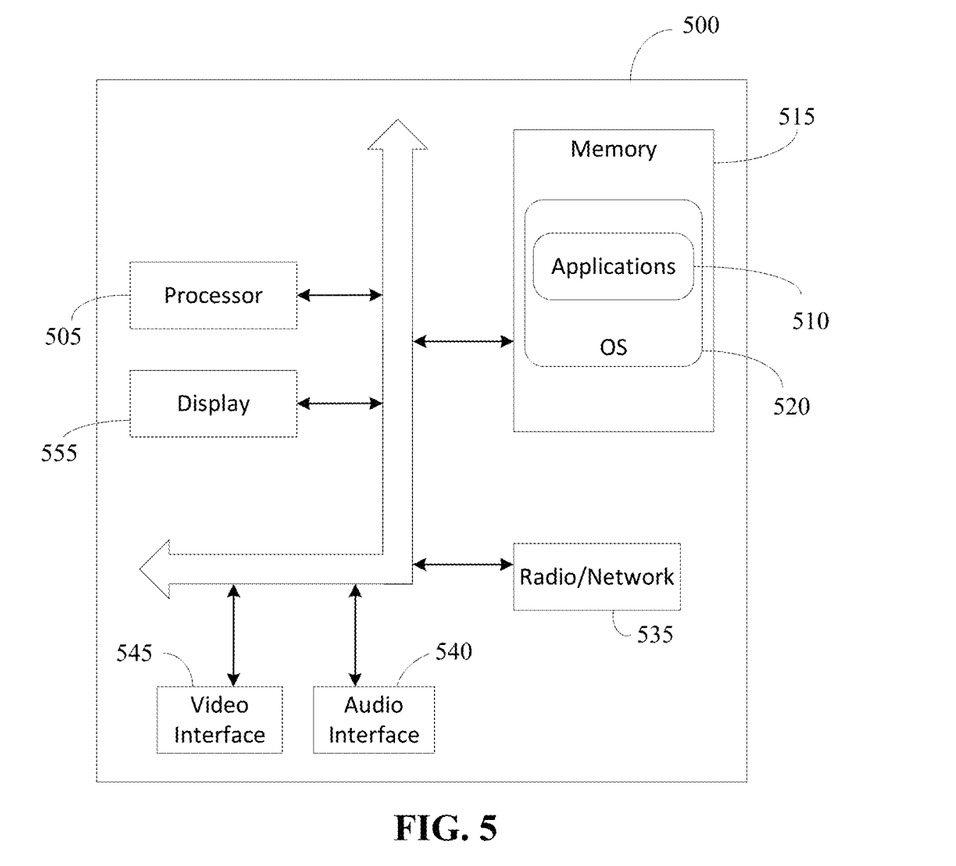
FIG. 5 is a block diagram illustrating components of a computing device used in some embodiments.

The client(s) 402, 404 can involve computing systems configured with one or more central processing units (CPUs), memory, mass storage, and I/O devices (e.g., network interface, user input device). Elements of a computing system can communicate with each other via a bus. FIG. 5.

FIG. 5 shows a block diagram illustrating components of a computing device used in some embodiments. For example, system 500 can be used in implementing a computing device such as tablet device 200 or smart phone device 300. It should be understood that aspects of the system described herein are applicable to both mobile and traditional desktop computers, as well as server computers and other computer systems.

For example, system 500 includes a processor 505 that processes data according to instructions of one or more application programs 510, and/or operating system (OS) 520. The processor 505 may be, or is included in, a system-on-chip (SoC) along with one or more other components such network connectivity components, sensors, video display components.

The one or more application programs 510 may be loaded into memory 515 and run on or in association with the operating system 520. Examples of application programs include phone dialer programs, e-mail programs, information management programs, word processing programs, Internet browser programs, messaging programs, game programs, notebook applications and the like. Other applications may be loaded into memory 515 and run on the device, including various client and server applications.

Examples of operating systems include SYMBIAN OS from Symbian Ltd., WINDOWS PHONE OS from Microsoft Corporation, WINDOWS from Microsoft Corporation, BLACKBERRY OS from Research In Motion Limited, IOS from Apple Inc., and ANDROID OS from Google Inc. Other operating systems are contemplated.

System 500 may also include a radio/network interface 535 that performs the function of transmitting and receiving radio frequency communications. The radio/network interface 535 facilitates wireless connectivity between system 500 and the "outside world," via a communications carrier or service provider. Transmissions to and from the radio/network interface 535 are conducted under control of the operating system 520, which disseminates communications received by the radio/network interface 535 to application programs 510 and vice versa.

The radio/network interface 535 allows system 500 to communicate with other computing devices, including server computing devices and other client devices, over a network.

In various implementations, data/information stored via the system 500 may include data caches stored locally on the device or the data may be stored on any number of storage media that may be accessed by the device via the radio/network interface 535 or via a wired connection between the device and a separate computing device associated with the device, for example, a server computer in a distributed computing network, such as the Internet. As should be appreciated such data/information may be accessed through the device via the radio interface 535 or a distributed computing network. Similarly, such data/information may be readily transferred between computing devices for storage and use according to well-known data/information transfer and storage means, including electronic mail and collaborative data/information sharing systems.

An audio interface 540 can be used to provide audible signals to and receive audible signals from the user. For example, the audio interface 540 can be coupled to speaker to provide audible output and a microphone to receive audible input, such as to facilitate a telephone conversation. System 500 may further include video interface 545 that enables an operation of an optional camera (not shown) to record still images, video stream, and the like.

Visual output can be provided via a display 555. The display 555 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

The display 555 may be a touchscreen display. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

Returning to FIG. 4, clients 402, 404 can be used to browse the Web and run applications such as a browser 406 or native notebook application 408. A user interface for applications such as the browser 406 may be in HTML, Objective C, Java, or other language depending on the platform.

A sharing and/or collaboration application, such as a notebook application may communicate with a share/collaborate service 410 to perform sharing, collaboration, and/or synching. In some cases, the share/collaborate service 410 supports the program as a whole (with a portal provided by the browser 406). A client (e.g., client 402 or 404) as well as a share/collaborate service 410 may communicate with capture service 415 to provide a URL enhancer when curating content as part of a note or other file/document.

By using an application running on the client (e.g., client 402 or 404), a user can access their notes and other content, which may be stored in the cloud (e.g., as storage 420)—by a cloud storage service.

The notebook service 410 and capture service 415 can be web services that are independently or jointly be hosted in the cloud or run by one or more allocated servers by an entity providing the notebook service or the capture service.

A cloud service generally refers to hosted services providing scalable processing and storage capabilities. Cloud computing may often include virtualized resources. The resources presented by cloud computing are in themselves provided as a service, where cloud computing customers rent usage of resources from a third-party provider that owns the physical infrastructure. Web services can be provided and/or hosted by a cloud service (e.g., as part of a large-scale distributed computing environment). A web service is a software system that supports interoperable machine-to-machine interaction over a network and enables software to connect to other software applications.

A web service provides a collection of technological standards and protocols. For example, a web service provides functions that may be implemented by a software or hardware agent that sends and receives messages (e.g., the computing platforms requesting and providing a particular service). Applications can access web services via ubiquitous web protocols and data formats such as hypertext transfer protocol (HTTP), extensible markup language (XML), JavaScript Object Notation (JSON), and SOAP (originally an acronym for simple object access protocol).

The capture service 415 may be implemented using one or more physical and/or virtual servers communicating over a network. In some cases, the capture service 415 may call another service or access another server (430) to perform some or all functions provided by the service. For example, the capture service or a separate service or servers may run a browser application (and virtual machine(s)) to capture the webpage content in order to provide a screenshot or other data to the client, storage, or share/collaborate service.

A virtual machine is a "virtualization" of a physical computer system, and may be backed by underlying physical resources. Virtual machines are often used to enable multiple operating systems (and corresponding applications) to run on a single physical machine by sharing the resources of the single physical machine across multiple environments while operating independently. Virtual machines are constructs providing an isolated container that can execute software and run applications by emulating a physical machine while not being restricted to only the resources available to a single physical machine.

Virtual machines running browsers are often used as part of search engines to facilitate the updating and validating of hyperlinks.

Although the service is described as being performed using virtual machines running browser applications, the service may use a browser application or other application tied more directly to a particular computer.

In addition to the share/collaborate service 410, the capture service 415 may be associated with other sharing and/or collaborating services, and even a web application component (WAC), to provide screenshots and other URL enhancements. WACs are components that enable a user to view and edit documents in a browser. WACs can function both as an endpoint (how a user accesses the service) and a service. In such embodiments, users have access to application software and databases on the cloud, which manages infrastructures and platforms. End users access software applications hosted on the cloud through a browser or app (an application designed for mobile devices such as smartphones and tablets).

The various networks described as part of the environment shown in FIG. 4 can include, but are not limited to, an internet, an intranet, or an extranet, and can be any suitable communications network including, but not limited to, a cellular (e.g., wireless phone) network, the Internet, a local area network (LAN), a wide area network (WAN), a Wi-Fi network, an ad hoc network or a combination thereof. Such networks may involve connections of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Figure 6:
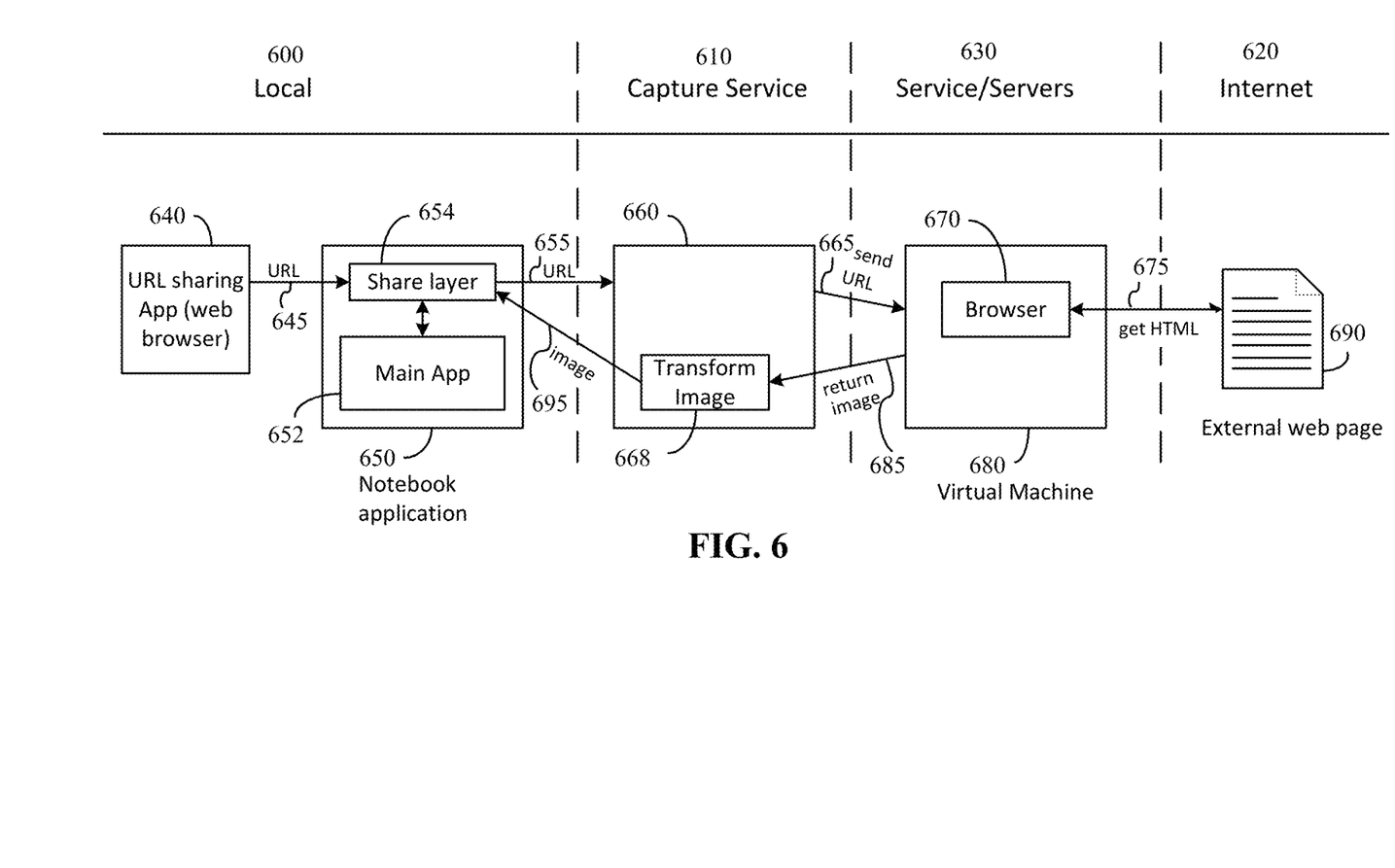
FIG. 6 illustrates a system architecture diagram and process flow for an example implementation.

FIG. 6 illustrates a system architecture diagram and process flow for an example implementation. The implementation can involve local applications 600, a capture service 610 for URL enhancement, and access to a source referenced by the URL over the Internet 620. Although the capture service 610 and service/servers 630 are shown as separate elements, the functions provided by the service/servers 630 can be carried out, in some cases, as part of the server(s) and functionality exposed by the capture service; while in other cases, the capture service calls another service to perform these functions.

In one contemplated scenario, a user at the client (e.g., local 600) may be using a URL sharing application 640, such as a web browser, and desires to share the link (or URL 645) to the content being viewed or even a screenshot or some other information about the site. A notebook application 650 or other content sharing and/or collaboration application can include a main application 652 and a share layer 654 that can communicate with the URL sharing application 640 to receive the URL 645 for insertion into the main application 652 of the notebook application 650.

To commence the capturing of the screenshot of a received URL 645, the local application (e.g., the notebook application 650, for example through the share layer 654) calls a capture service/server 660 that takes the request and the URL 655 from the local application (e.g., the share layer 654 of the notebook application 650) and opens the URL in a browser 670 running on a virtual machine 680. When the virtual machine is hosted by separate service/servers 630, the capture service/server 660 sends the URL 665 to the service/servers 630. The URL is opened (by getting the HTML 675) and its content (e.g., the external webpage 690) rendered. The URL content may be a webpage or some other file type.

A screen shot of the URL rendered on the virtual machine 680 is then captured and the image (and/or other data) returned to the application used to share content (e.g., notebook application 650).

For example, an image of the external webpage 690 can be captured from the browser 670 and returned (685) to the capture service/server 660. The capture service can transform (668) the image (685) obtained from the browser 670 into a form customized for the client.

In another example, the full page HTML of the external webpage 690 can be captured and returned to the capture service/server 660. Additional processing may occur as part of the capture service. For example, the image or HTML may be transformed to provide a representation of the webpage customized for the client.

In some cases, the transforming can include removing advertisements from main content of a webpage. In some cases, the transforming can include separating readable text from the rendered content to generate an image from the readable text. In some cases, the transforming can include providing hyperlink recognition so that internal links shown in the image can be made "live" and selectable. In some cases, the transforming can include removing repetitive background content from the rendered content. The transforming can be any combination of the above or other types of transformational processes including filtering, text recognition, image recognition, and tagging.

In some cases, the URL may be sent to another web service that can determine metadata associated with the content of the webpage. The metadata can include topical tags that may then be included with the HTML file or the image to help with search or other processes that may be carried out after capturing the webpage. Topical tags include tags related to the content based on the context, images, topics, or other related topics.

The transformed image 695 can be provided to the notebook application 650.

Figure 7:
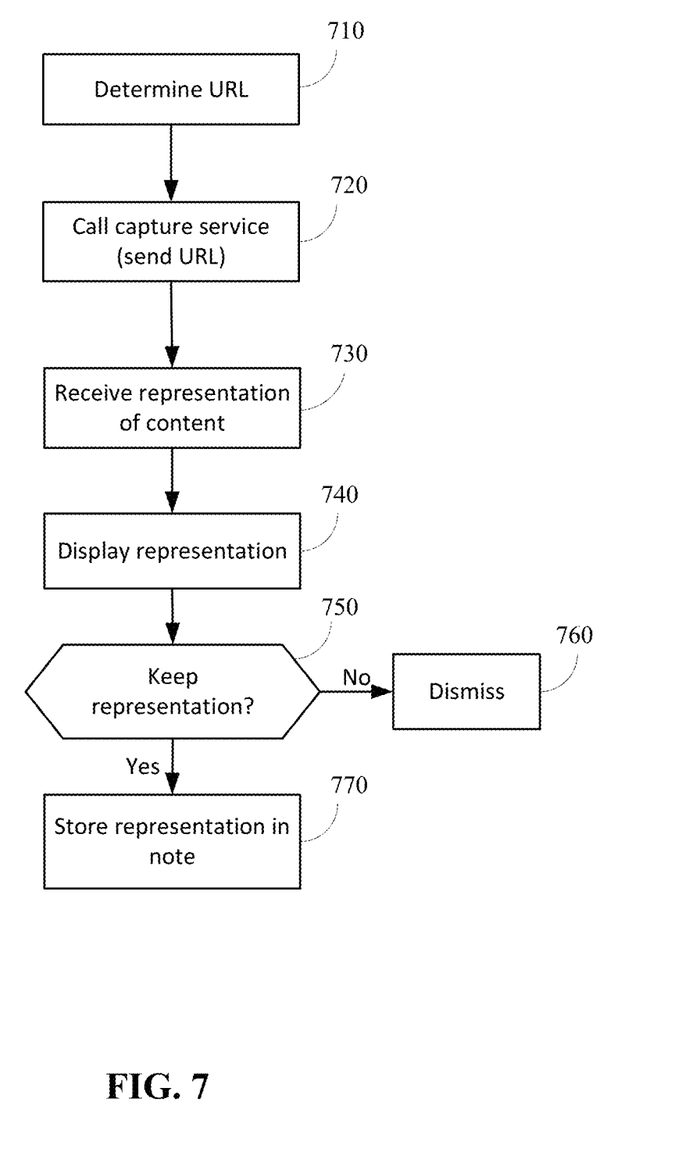
FIG. 7 illustrates a process flow for enhancing a URL in curation and collaboration applications.

FIG. 7 illustrates a process flow for enhancing a URL in curation and collaboration applications. A client application can determine a URL that may be shared (and inserted) into a note or other document (710). The determination may include recognizing a string of characters that are inserted into a note or other document as a URL (see, for example, the description corresponding to FIG. 1A). The string of characters may be input by a user, for example, through typing or performing a copy and paste. In some embodiments, the string of characters may be input programmatically when clipping or pinning to the note, file, or document content from a website. The determination can include receiving the URL directly or indirectly from a web browser of a client.

After determining a URL for content being curated, an image of the webpage can be obtained. For example, a capture service can be called (720). According to certain implementations, the client can enhance URLs shared to a note by calling an API of the capture service. A representational state transfer (REST) API can be provided that accepts URL enhancement requests and runs code that enables the webpage to be rendered and captured. In a web browser such as MICROSOFT INTERNET EXPLORER or GOOGLE CHROME, MOZILLA FIREFOX, or APPLE SAFARI, a user may select to share a webpage.

A sharing layer (such as sharing layer 654 of a notebook application 650) can communicate with the browser and can call the REST API. The request can include some or all of a header (including client version), web browser identifier (e.g., user agent), locale, client screen resolution, URL, client signature (client authentication), and client generated correlation identifier (ID). In some implementations, the request may simply contain the URL and client signature (authentication). In other implementations, additional elements may be included in the request.

The response can include a representation of the webpage customized for the client. For example, the representation may be customized for the view port of the client (e.g., customized for a mobile device). In operation (730), the client can receive the representation of the content and display the representation (740). In one scenario, the response received by the client can be HTTP with a success response code and a JPEG compressed image (or other screenshot file or code). In some cases, a failure response may be returned when an error arises so that a particular error message may be displayed at the client. The response received by the client can be parsed, decoded, stored and then rendered in the user interface (preview pane).

The representation may be previewed so that a user may determine whether to keep the representation (750). If the user decides to not keep the representation, for example by deselecting a checkbox or other input field, the representation can be dismissed (760). Otherwise, the representation can be stored in the note (770). Once the user indicates that the screenshot is to be used in the notebook application (for example by indicating "share" or "send" or "OK"), the shared page data can be stored at a temporary location that is later opened and consumed by the notebook application. From within the notebook application, a user can annotate on, above, below, or at sides of the image. The notebook application can be run on clients including, desktop, web application, smart phones, tablets, and other computing devices. Some examples of the representation displayed for preview are shown in FIGS. 2D and 3B.

The image can be scaled down to smaller sizes when rendering on a user device from within a local notebook application. In some embodiments, the full page image may be rendered by a web component.

Figure 8:
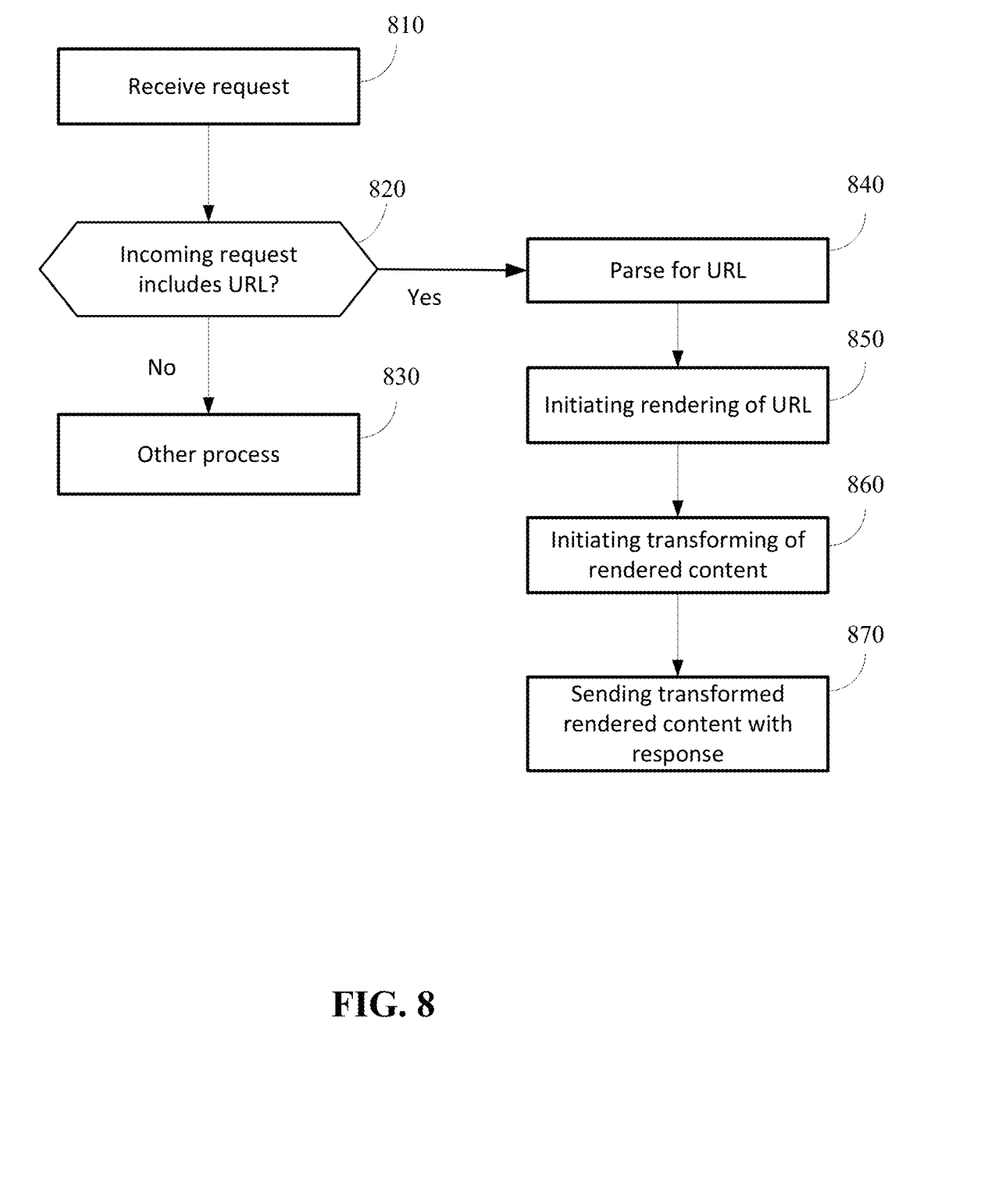
FIG. 8 illustrates a process flow for generating a URL enhancement for curation and collaboration applications.

FIG. 8 illustrates a process flow for generating a URL enhancement for curation and collaboration applications. Referring to FIG. 8, a capture service may receive a request 810. A determination is made as to whether the request includes a URL (820). If there is no URL in the incoming request, then the server continues on to other processes (830). If it is determined that the request includes a URL, then the capture service can proceed to perform steps to enhance the URL link. For example, the request can be parsed to obtain the URL (840). The capture service can initiate the rendering of the URL (850). The rendering of the URL may be performed by the capture service or the capture service can initiate the rendering of the URL by calling another service (such as service/servers 630 of FIG. 6).

Once the URL is rendered, the capture service can initiate the transforming of rendered content into a form customized for the client (860) and then send the transformed rendered content with the response to the client (870). In some cases, the transforming of content can include optimizing the image (or other representation of the page for the client to render effectively.

In addition to providing a screenshot or other representation of a webpage, the enhancement/capture service can also provide the computing capabilities (or call another service) for performing automatic tag suggestions during the capture experience, as well as other types of immediate augmentation.

The capture service may include systems that can open a URL in a browser, take a screenshot (or obtain other information), and return the screenshot to a client for inserting into a note. The systems that can open the URL in the browser and take a screenshot may be part of the capabilities of the capture service or may be another service that the capture service calls (as part of initiating the rendering of the URL 850). For example, the capture service may call (or involve) dynamic website crawling services that can generate a virtual machine having parameters for a high resolution window, open up the URL in a browser, take a screenshot and return the screenshot to the capture service.

The client request to get a screenshot of the content referenced by the URL can include an API call to the service providing URL of capture in the request. The request can optionally include content negotiation (request for a particular version or format when available) and hashing (for URL validation). In one embodiment, the content type is JavaScript Object Notation (JSON). In addition, a width and height parameter may optionally be included. The width and height may be useful where the size of the webpage is known.

The server response may be in HTTP. When the fetch (request and response with content) of the screenshot is successful, the response from the server may indicate that the capture was a success and include the screenshot image (or other form of the webpage).

In some cases, an entire image may be provided. For example, when a JPEG is requested. In some cases, the image may be provided as image slices that are returned to the client in portions. For example, the image slices may be 400-600 KB in size. In some cases, the slices are determined based on image height (and each slice may be 1000-3000 pixels) instead of size. For example, if the image is taller than 2000 pixels, the image can be split at each 2000 pixel interval (give or take a certain amount of pixels). Splitting the image into slices (and sending the slices in separate, smaller sized files) can help transferring of the file over various networks and clients may download slices incrementally as desired (reducing potentially large data transfers across metered or low bandwidth connections).

To send multiple images (due to image splitting), the images can be sent in a single request (for example after encoding the images); the images may be requested individually by the client from a temporary storage location; or the images can be sent together in a zip file.

When using a static window size, it can be expected that there will be empty space in many cases where a webpage contains content within a smaller window. The transformation of the image performed by the capture service can include processing the image to remove extra spacing, if any, at the bottom of the page.

To remove or reduce the amount of empty space in the image, cropping can be automatically performed. In one implementation, the cropping can be accomplished by loading the image into memory and then starting from the bottom to the top, determine if two slices (for example, at around 100 pixels each) are the same. Once a slice is met that is different (by a certain amount), then the repetitive pixels can be removed.

In one scenario, the size of the virtual machine's window when rendering the webpage can be 1024×12000 pixels. In some other scenarios, the window height may be 20000, 30000 or more pixels or even 8000, 5000 or less pixels in height. Of course, the window size for rendering may change should webpage sizes change.

Many webpages are much shorter than the 12,000 pixel height that may be used in certain implementations for rendering the webpage in the browser of the virtual machine. To minimize the insertion of unnecessarily tall images into users' notebooks, redundant background portions of the page can be automatically cropped.

A simplified algorithm that may be used to crop the redundant background portions can involve starting at the bottom of an image of the webpage and comparing the last n number of rows of pixels to then number of rows of pixels just above. Then number of rows of pixels can be any suitable number of rows, for example n may be 100 rows (of course more or fewer rows may be used in such an algorithm). If most pixel pairs (where a pair is one pixel from the top slice and its corresponding pixel from the bottom slice) match within a certain tolerance to accommodate lossy compression, the bottom slice is deleted, and the top slice of the two is compared with a next n rows of pixels just above that slice. Once a threshold indicating fewer matching pairs, the algorithm can be considered complete. The threshold indicating fewer than "most" pixel pairs can be a difference between slices of less than 50%. In addition to using a majority/minority threshold, other thresholds that may be used include, but are not limited to, less than 80% matching, less than 45% matching, less than 30% matching, or less than 10% matching.

It should be understood that the cropping is just one approach to create useful screenshots. Other implementations may vary the maximum height for different domains, raise or lower maximum height parameter, use a screenshot provider that can return dynamic height images, or perform other processes.

Some webpages or filepaths require authentication or other security measures to access the content. In one embodiment, such webpages are not retrieved. For example, an attempt to retrieve a URL having a prefix of HTTPS may be avoided by the service, and instead, a message displayed to the user that the webpage is not going to be able to be attached. In some other cases, the screenshot returned is of the log-in page or any other page a website provides when the appropriate authentication is not provided. In one embodiment, user credentials may be used to enable the screenshot to be taken on behalf of the user. For example, a user may provide authorization for the capture service to retrieve the webpage and grant permission for the capture service to use the appropriate authentication (or cookies or other credentials or tokens used to establish the secure connection).

Upon approval by the user, the service can impersonate the user to access the webpage or file requiring payment or log-in. Impersonation refers to the ability of a thread (a sequence of programmed instructions) to execute using different security information than the process that owns the thread. For example, a client may own a thread, but a server application (such one associated with the capture service or the virtual machine rendering the webpage) can impersonate the client in order to execute the thread. This allows the server thread to act on behalf of that client to access objects (e.g., the document or webpage) on the server or validate access to the client's own objects.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Carrier waves and other propagating signals that may contain data usable by a computer system are not themselves "computer-readable storage media."

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Example scenarios have been presented to provide a greater understanding of certain embodiments of the present invention and of its many advantages. The example scenarios described herein are simply meant to be illustrative of some of the applications and variants for embodiments of the invention. They are, of course, not to be considered in any way limitative of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:
1. A method of enhancing a link in collaboration applications, comprising:
   determining, from content entered into a body of a collaboration application, a string of characters indicating a uniform resource locator (URL);
   upon determining the string of characters indicating the URL from the content entered into the body of the collaboration application, automatically calling a first web service to obtain a representation of content referenced by the URL by sending a request to the first web service, wherein the request at least comprises the URL and content negotiation for a particular format for the content;

receiving the representation of the content referenced by the URL from the first web service in the format requested such that the content is customized for the collaboration application, a computing device on which the collaboration application is implemented, or both; and displaying the representation of the content referenced by the URL in the body of the collaboration application.

2. The method of claim 1, wherein the representation comprises HTML.

3. The method of claim 1, wherein the calling of the first web service, the receiving of the representation of the content, and the displaying of the representation of the content are automatically performed in response to determining the string of characters indicating the URL.

4. The method of claim 1, wherein the determining of the string of characters indicating the URL comprises performing text recognition.

5. The method of claim 1, further comprising:
sending the URL to a second web service that determines metadata associated with the content; and
receiving the metadata associated with the content.

6. The method of claim 5, wherein the metadata associated with the content comprises topical tags.

7. A system comprising:
a processor;
a display;
memory; and
instructions stored on the memory that when executed by the processor directs the system to:
determine, from content entered into a body of a collaboration application, a string of characters indicating a uniform resource locator (URL);
upon determining the string of characters indicating the URL from the content entered into the body of the collaboration application, automatically call a first web service to obtain a representation of content referenced by the URL by sending a request to the first web service, wherein the request at least comprises the URL and content negotiation for a particular format for the content;
receive the representation of the content referenced by the URL from the first web service in the format requested such that the content is for the collaboration application, a computing device on which the collaboration application is implemented, or both; and
display the representation of the content referenced by the URL in the body of the collaboration application.

8. The system of claim 7, wherein the request to the first web service comprises an Application Program Interface (API) call to the first web service.

9. The system of claim 7, wherein the system automatically performs the instructions to call the first web service, receive of the representation of the content, and display the representation of the content in response to determining the string of characters indicating the URL.

10. The system of claim 7, wherein the determining of the string of characters indicating the URL comprises performing text recognition.

11. The system of claim 7, further comprising instructions to:
send the URL to a second web service that determines metadata associated with the content; and
receive the metadata associated with the content.

12. The system of claim 11, wherein the metadata associated with the content comprises topical tags.

13. A computer-readable storage medium having instructions stored thereon, that when executed by a processor, perform a method comprising:
determining, from content entered into a body of a collaboration application, a string of characters indicating a uniform resource locator (URL);
upon determining the string of characters indicating the URL from the content entered into the body of the collaboration application, automatically calling a first web service to obtain a representation of content referenced by the URL by sending a request to the first web service, wherein the request at least comprises the URL and content negotiation for a particular format for the content;
receiving the representation of the content referenced by the URL from the first web service in the format requested such that the content is for the collaboration application, a computing device on which the collaboration application is implemented, or both; and
displaying the representation of the content referenced by the URL in the body of the collaboration application.

14. The computer-readable storage medium of claim 13, wherein the particular format is a data interchange format.

15. The computer-readable storage medium of claim 13, wherein the calling of the first web service, the receiving of the representation of the content, and the displaying of the representation of the content are automatically performed in response to determining the string of characters indicating the URL.

16. The computer-readable storage medium of claim 13, wherein the determining of the string of characters indicating the URL comprises performing text recognition.

17. The computer-readable storage medium of claim 13, wherein the method further comprises:
sending the URL to a second web service that determines metadata associated with the content; and
receiving the metadata associated with the content.

18. The method of claim 1, wherein the request to the first web service comprises an Application Program Interface (API) call to the first web service.

19. The method of claim 1, wherein the particular format is a data interchange format.

* * * * *